US012032307B2

(12) United States Patent
Wang et al.

(10) Patent No.: US 12,032,307 B2
(45) Date of Patent: Jul. 9, 2024

(54) DEVELOPING CARTRIDGE HAVING ELECTRODE CONTACTABLE WITH ANOTHER ELECTRODE BY PIVOT MOTION OF THE CARTRIDGE

(71) Applicant: BROTHER KOGYO KABUSHIKI KAISHA, Nagoya (JP)

(72) Inventors: Yuwen Wang, Nagoya (JP); Junichi Hashimoto, Toyohashi (JP); Isao Kishi, Nagoya (JP); Kazuaki Ooka, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 6 days.

(21) Appl. No.: 18/147,778

(22) Filed: Dec. 29, 2022

(65) Prior Publication Data

US 2023/0136526 A1 May 4, 2023

Related U.S. Application Data

(63) Continuation of application No. 17/117,314, filed on Dec. 10, 2020, now Pat. No. 11,573,503, which is a (Continued)

(30) Foreign Application Priority Data

Mar. 30, 2018 (JP) ................................ 2018-067902

(51) Int. Cl.
*G03G 15/08* (2006.01)
*G03G 21/16* (2006.01)
*G03G 21/18* (2006.01)

(52) U.S. Cl.
CPC ..... *G03G 15/0808* (2013.01); *G03G 21/1652* (2013.01); *G03G 21/1821* (2013.01)

(58) Field of Classification Search
CPC ........... G03G 21/1652; G03G 21/1821; G03G 21/1839; G03G 21/1842; G03G 15/0808
See application file for complete search history.

(56) References Cited

U.S. PATENT DOCUMENTS

2007/0009281 A1 1/2007 Sato et al.
2007/0009282 A1 1/2007 Sato et al.
(Continued)

FOREIGN PATENT DOCUMENTS

CN 201909946 U 7/2011
CN 102200728 A 9/2011
(Continued)

OTHER PUBLICATIONS

International Search Report and Written Opinion issued in related International Patent Application No. PCT/JP2019/007901, Apr. 23, 2019.

(Continued)

*Primary Examiner* — Walter L Lindsay, Jr.
*Assistant Examiner* — Andrew V Do
(74) *Attorney, Agent, or Firm* — Merchant & Gould P.C.

(57) ABSTRACT

A developing cartridge includes a casing having an outer surface, a developing roller, a first electrode, and a boss. The developing roller is movable together with the casing and includes a developing roller shaft extending along a first axis extending in a first direction. The developing roller is rotatable about the first axis. The first electrode is positioned at one end portion in the first direction of the developing roller shaft, and electrically connected to the developing roller shaft. The boss is positioned at one end portion in the first direction of the outer surface. The boss extends in the first direction and is engageable with the drum unit. A part of the first electrode is configured to contact with a second electrode of the drum unit as a result of pivotal movement (Continued)

of the developing cartridge about the boss relative to the drum unit.

20 Claims, 8 Drawing Sheets

Related U.S. Application Data continuation of application No. 16/290,152, filed on Mar. 1, 2019, now Pat. No. 10,890,857.

(56) References Cited

U.S. PATENT DOCUMENTS

| | | | |
|---|---|---|---|
| 2007/0077087 | A1 | 4/2007 | Okabe et al. |
| 2011/0076049 | A1 | 3/2011 | Kato |
| 2011/0206410 | A1 | 8/2011 | Okabe |
| 2011/0236051 | A1 | 9/2011 | Kato |
| 2012/0141170 | A1 | 6/2012 | Kamimura et al. |
| 2014/0363189 | A1 | 12/2014 | Hashimoto et al. |
| 2016/0274495 | A1 | 9/2016 | Kato |
| 2017/0185001 | A1 | 6/2017 | Itabashi et al. |
| 2018/0017928 | A1 | 1/2018 | Ichikawa et al. |

FOREIGN PATENT DOCUMENTS

| | | | |
|---|---|---|---|
| CN | 104238310 | A | 12/2014 |
| EP | 1 742 117 | A1 | 1/2007 |
| JP | 4-229885 | A | 8/1992 |
| JP | 2000-194247 | A | 7/2000 |
| JP | 2007-47402 | A | 2/2007 |
| JP | 2007-101635 | A | 4/2007 |
| JP | 2007-102152 | A | 4/2007 |
| JP | 2011-75653 | A | 4/2011 |
| JP | 2011-170130 | A | 9/2011 |
| JP | 2011-203630 | A | 10/2011 |
| JP | 2014-16498 | A | 1/2014 |
| JP | 2014-238500 | A | 12/2014 |
| JP | 2017-116827 | A | 6/2017 |
| JP | 2018-10242 | A | 1/2018 |

OTHER PUBLICATIONS

Office Action issued in corresponding Chinese Patent Application No. 201980000412.6, Aug. 9, 2021.

Office Action issued in corresponding Canadian Patent Application No. 3,094,941, Oct. 8, 2021.

Extended European Search Report issued in corresponding European Patent Application No. 19711489.5, Oct. 27, 2021.

Chinese Office Action issued in corresponding Chinese Patent Application No. 201980000412.6, mailed Jan. 10, 2022.

Notice of Reasons for Refusal issued in corresponding Japanese Patent Application No. 2018-067902, mailed Mar. 8, 2022.

DEVELOPING CARTRIDGE HAVING ELECTRODE CONTACTABLE WITH ANOTHER ELECTRODE BY PIVOT MOTION OF THE CARTRIDGE

CROSS REFERENCE TO RELATED APPLICATION

This application is a continuation of U.S. patent application Ser. No. 17/117,314, filed Dec. 10, 2020, which is a continuation of U.S. patent application Ser. No. 16/290,152, filed Mar. 1, 2019, now U.S. Pat. No. 10,890,857, which claims priority from Japanese Patent Application No. 2018-067902 filed Mar. 30, 2018. The entire content of the priority applications are incorporated herein by reference.

TECHNICAL FIELD

The present disclosure relates to a developing cartridge attachable to and detachable from a drum unit.

BACKGROUND

There is conventionally known an electro-photographic type image forming apparatus such as a laser printer and an LED printer. The image forming apparatus includes a drum unit and a plurality of developing cartridges. The drum unit includes a plurality of photosensitive drums. The developing cartridge includes a developing roller. The plurality of developing cartridges are attachable to and detachable from the drum unit. Upon attachment of the developing cartridge to the drum unit, the photosensitive drum of the drum unit and the developing roller of the developing cartridge are in contact with each other.

SUMMARY

According to the above described image forming apparatus, a bias voltage is applied to a shaft of the developing roller in order to carry developing agent on the surface of the developing roller. To this effect, an electrode is provided at an end portion of the developing roller. Upon attachment of the developing cartridge to the drum unit, the electrode positioned at the end portion of the developing cartridge contacts an electrode provided at the drum unit. Hence, bias voltage is supplied to the shaft of the developing roller through the electrodes. According to the conventional structure, a spring is provided between a casing of the developing cartridge and the electrode for ensuring contact between electrodes.

In view of the foregoing, it is an object of the disclosure to provide a developing cartridge capable of making contact between an electrode of a developing cartridge and an electrode of a drum unit without employment of a spring between a casing of the developing cartridge and the electrode at a time of attachment of the developing cartridge to the drum unit.

In order to attain the above and other objects, according to one aspect, the disclosure provides a developing cartridge attachable to and detachable from a drum unit. The developing cartridge includes a casing having an outer surface, a developing roller, a first electrode, and a boss. Developing agent is accommodatable in the casing. The developing roller is movable together with the casing and includes a developing roller shaft extending along a first axis extending in a first direction. The developing roller is rotatable about the first axis. The first electrode is positioned at one end portion in the first direction of the developing roller shaft, and electrically connected to the developing roller shaft. The boss is positioned at one end portion in the first direction of the outer surface. The boss extends in the first direction. A part of the first electrode is configured to contact with a second electrode of a drum unit as a result of pivotal movement of the developing cartridge about the boss relative to the drum unit in a case where the developing cartridge is attached to the drum unit.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

A developing cartridge according to one embodiment will be described with reference to the accompanying drawings. Firstly, an image forming apparatus 100 will be described with reference to FIG. 1.

1. Image Forming Apparatus

Figure 1:
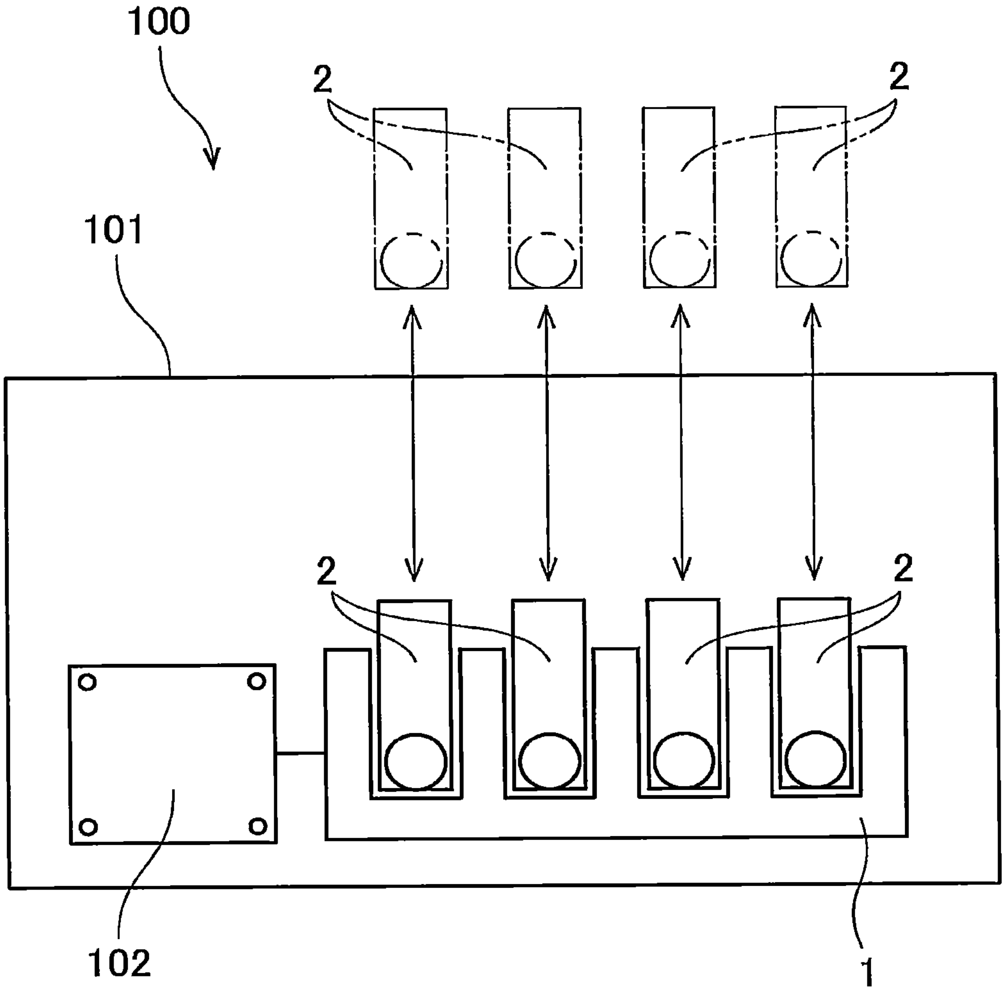
FIG. 1 is a conceptual diagram of an image forming apparatus.

The image forming apparatus 100 illustrated in FIG. 1 is an electro-photographic type printer, such as a laser printer and an LED printer. The image forming apparatus 100 includes a main casing 101, a controller 102, a drum unit 1, and four developing cartridges 2. Each of the developing cartridges 2 is attachable to and detachable from the drum unit 1 independent of each other. Further, the drum unit 1 to which four developing cartridges 2 are attached is attachable to and detachable from the main casing 101.

Figure 3:
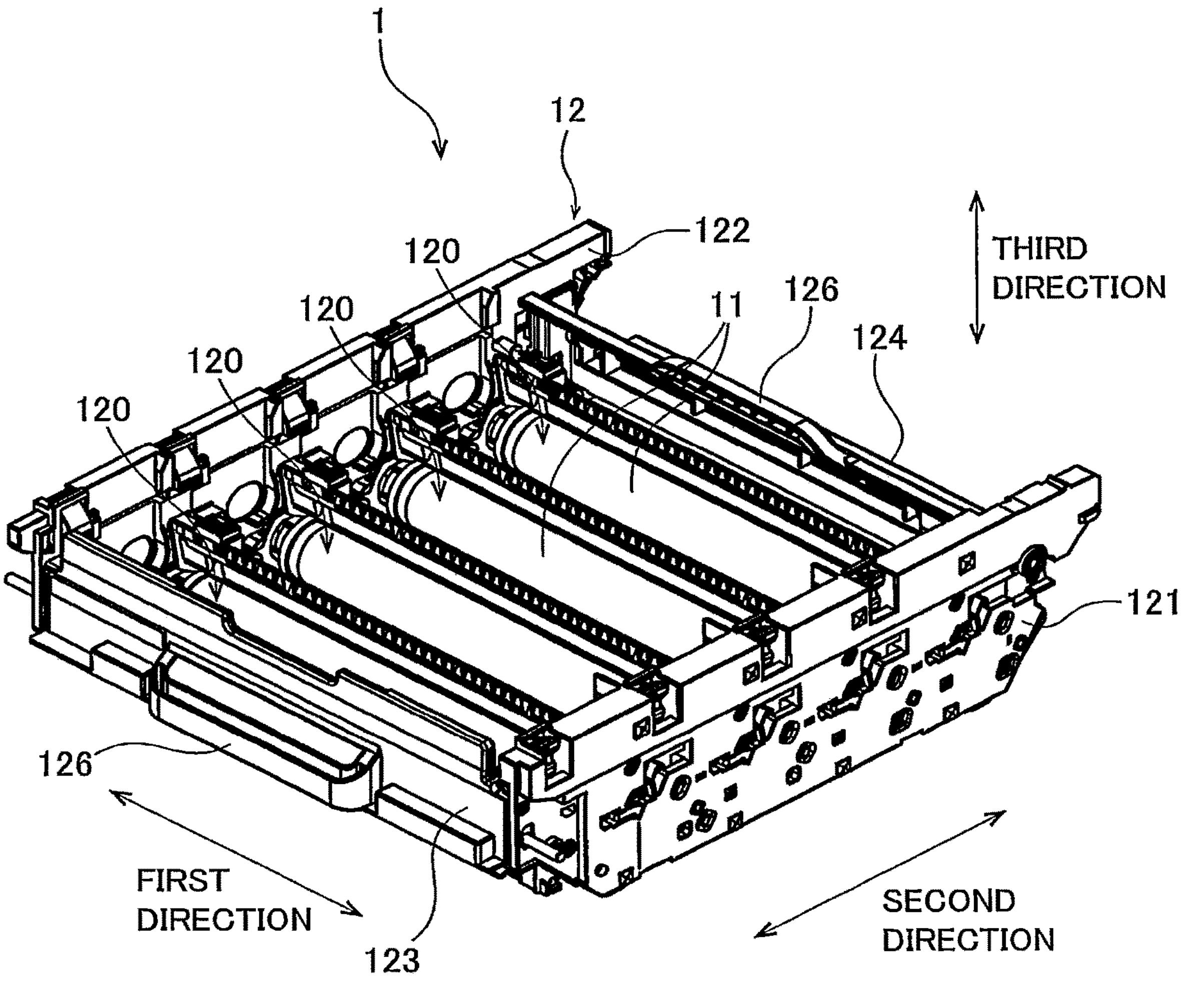
FIG. 3 is a perspective view of the drum unit.

As described later in detail, each developing cartridge 2 includes a developing roller 22 (FIG. 5), and the drum unit 1 includes four photosensitive drums 11 (FIG. 3). In a state where the developing cartridge 2 is attached to the drum unit 1, extending direction or an axial direction of the developing roller 22 will be referred to as "first direction". Further, a direction of an array of the four photosensitive drums 11 will be referred to as "second direction" crossing the first direction. Further, a direction crossing the first and second directions will be referred to as "third direction". Preferably, the third direction is perpendicular to the first and second directions, and is coincident with or approximately equal to a gravitational direction.

The four developing cartridges 2 store developing agent (for example, toner) of different colors such as for example, cyan, magenta, yellow, and black. The image forming apparatus 100 is configured to form an image on a recording surface of a printing sheet by toner supplied from respective four developing cartridges 2. However, numbers of the developing cartridges may be 1 through 3 or five or more.

The controller 102 is positioned inside the main casing 101. The controller 102 is provided by, for example, a circuit board including a processor such as CPU, and various memories. The controller 102 performs various processing executed in the image forming apparatus 100 by operating the processor in accordance with various programs.

2. Drum Unit

Figure 2:
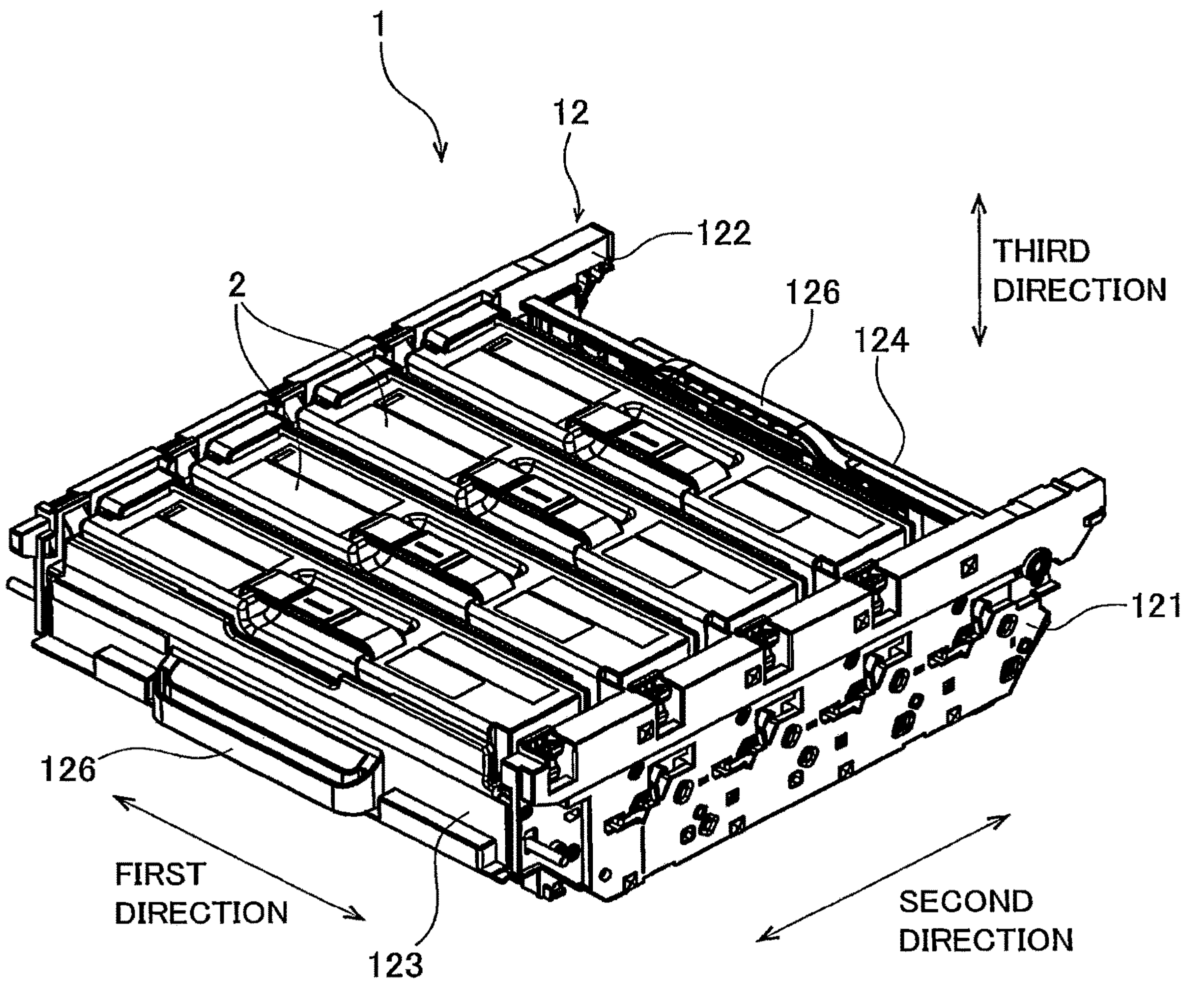
FIG. 2 is a perspective view of a drum unit to which four developing cartridges according to one embodiment are attached.

As illustrated in FIGS. 2 and 3, the drum unit 1 includes the four photosensitive drum 11, and a frame 12.

The photosensitive drum 11 is configured to receive toner supplied from the developing cartridge 2 to form a toner image, and the toner image is transferred to a printing sheet. Four photosensitive drums 11 are arrayed in the second direction with a space between neighboring photosensitive drums. Each photosensitive drum 11 has a cylindrical outer surface extending in the first direction. The outer surface is made from a photosensitive material. Further, each photosensitive drum 11 is rotatable about a rotation axis extending in the first direction.

The frame 12 is configured to hold the four photosensitive drums 11. The frame 12 includes four holding portions 120 each for holding each developing cartridge 2. The four holding portions 120 are arrayed in the second direction with an interval between neighboring holding portions 120. Each photosensitive drum 11 is positioned at one end portion in the third direction of each holding portion 120. Each developing cartridge 2 is attachable to and detachable from each holding portion 120. Upon completion of attachment of the developing cartridge 2 to the holding portion 120, an outer surface of the developing roller 22 is in contact with an outer surface of the photosensitive drum 11.

The frame 12 includes a first side plate 121, a second side plate 122, a third side plat 123, and a fourth side plate 124. The first side plate 121 extends in the second direction and the third direction and perpendicular to the first direction. The first side plate 121 is positioned at one side of the four photosensitive drums 11 in the first direction. Each one end portion in the first direction of each photosensitive drum 11 is rotatably supported to the first side plate 121. The second side plate 122 extends in the second direction and the third direction and perpendicular to the first direction. The second side plate 122 is positioned at another side of the four photosensitive drums 11 in the first direction. Each another end portion in the first direction of each photosensitive drum 11 is rotatably supported to the second side plate 122.

The third side plate 123 extends in the first direction and the third direction. The third side plate 123 is connected between one end portion in the second direction of the first side plate 121 and one end portion in the second direction of the second side plate 122. The third side plate 123 is positioned at one side in the second direction of the array of the four photosensitive drums 11. The fourth side plate 124 extends in the first direction and the third direction. The fourth side plate 124 is connected between another end portion in the second direction of the first side plate 121 and another end portion in the second direction of the second side plate 122. The fourth side plate 124 is positioned at another side in the second direction of the array of the four photosensitive drums 11. A handle 126 is provided at the third side plate 123, and another handle 126 is positioned at the fourth side plate 124. A user grips the handles 126 for the attachment and detachment of the drum unit 1 to and from the main casing 101.

Figure 8:
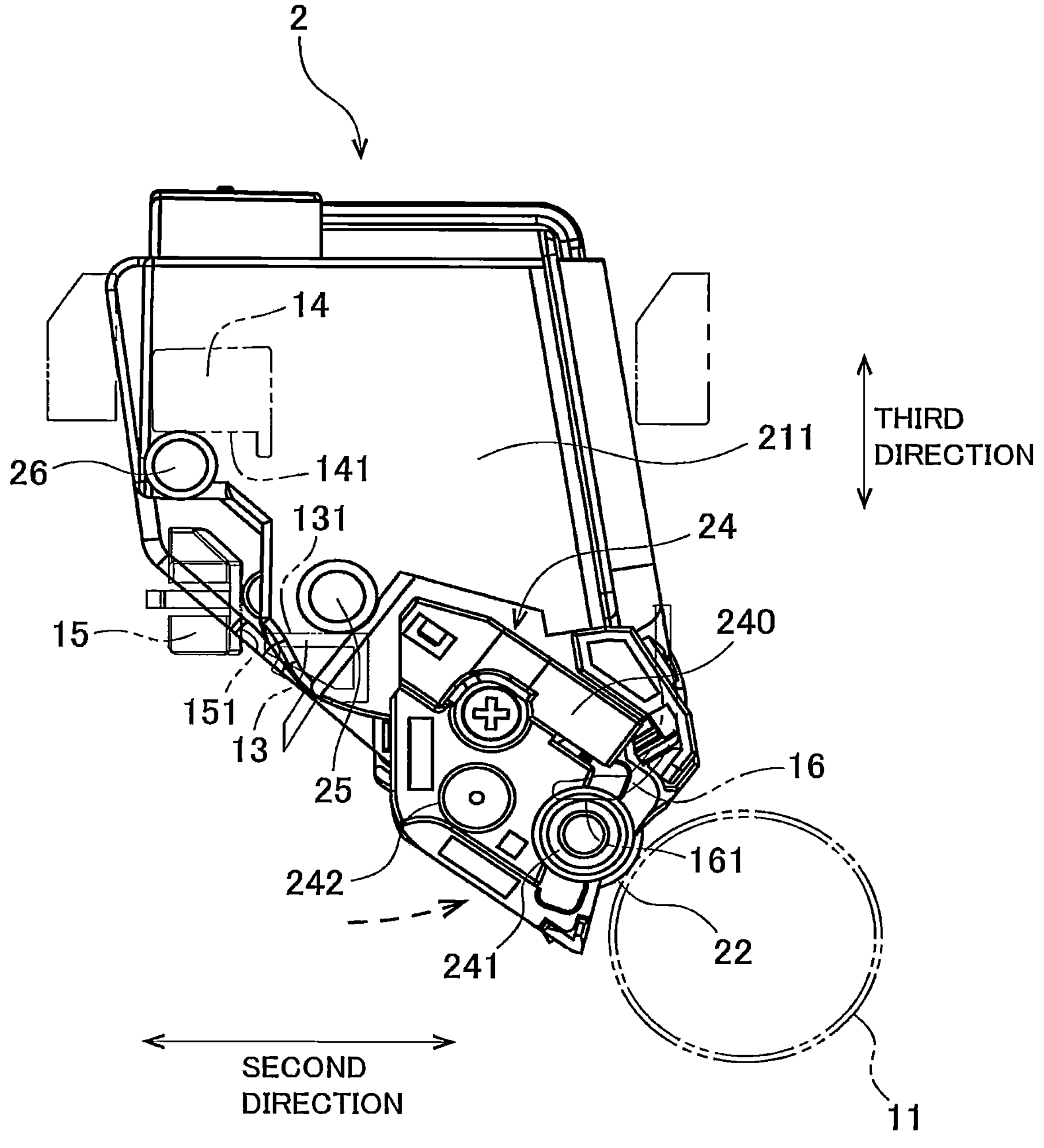
FIG. 8 is a plan view of the developing cartridge according to the embodiment as viewed in the first direction, and particularly illustrating positional relationship between the developing cartridge and components of the drum unit.

As illustrated in FIG. 8, the first side plate 121 of the drum unit 1 is provided with a support portion 13, a first pressure portion 14, a second pressure portion 15 and the electrode 16 as an example of second electrode.

The support portion 13 protrudes from the first side plate 121 toward the second side plate 122, and tubular in shape. The support portion 13 has a support surface 131 extending in a direction perpendicular to the third direction. The support surface 131 faces in a direction opposite to the photosensitive drum 11.

The first pressure portion 14 is pivotally movable about a shaft positioned at the first side plate 121 and extending in the second direction. The first pressure portion 14 has a first pressure surface 141. The first pressure surface 141 has a width in the second direction, and is arcuate in shape. The first pressure portion 14 is pivotally movable between a lock position and a release position. When the first pressure portion 14 is positioned at the release position, the first pressure surface 141 faces the second side plate 122. The first pressure surface at the lock position is positioned closer to the second side plate 122 than the first pressure surface at the release position is to the second side plate 122. A resiliently deformable member such as a spring (not illustrated) is connected to the first pressure portion 14 so as to urge the first pressure portion 14 to its lock position.

The second pressure portion 15 is positioned adjacent to a surface of the first side plate 121, the surface facing the second side plate 122. The second pressure portion is movable in the second direction. The second pressure portion 15 has a second pressure surface 151 extending perpendicular to the second direction. The second pressure portion 15 is movable in the second direction between a pressure position and a retracted position. The second pressure surface 151 at its pressure position is positioned closer to the photosensitive drum 11 in the second direction than the second pressure surface 151 at its retracted position is to the photosensitive drum 11. A resiliently deformable member such as a spring (not illustrated) is connected to the second pressure portion 15 so as to urge the second pressure portion 15 to its pressure position.

The electrode 16 is fixed to the surface of the first side plate 121, the surface facing the second side plate 122. The electrode 16 is made from electrically conductive material, for example, electrically conductive metal and electrically conductive resin. The electrode 16 has a contact surface 161 extending perpendicular to the third direction, and facing to the photosensitive drum 11. The electrode 16 is configured to be supplied with voltage from the above-described controller 102.

The second side plate 122 of the drum unit 1 is provided with a support portion, a first pressure portion, and a second pressure portion, those corresponding to the support portion 13, the first pressure portion 14, and the second pressure portion 15 of the support portion 13, the first pressure portion 14, and the second pressure portion 15, respectively. Further, the second side plate 122 has a contact surface. The contact surface of the second side plate 122 and the contact surface 161 of the second electrode 16 of the first side plate 121 are positioned on an identical linear line extending in the first direction. Further, the contact surface of the second side plate 122 has a shape the same as that of the contact surface 161 of the electrode 16 of the first side plate 121. However, the contact surface of the second side plate 122 is made from non-electrically conductive material.

3. Developing Cartridge

Figure 4:
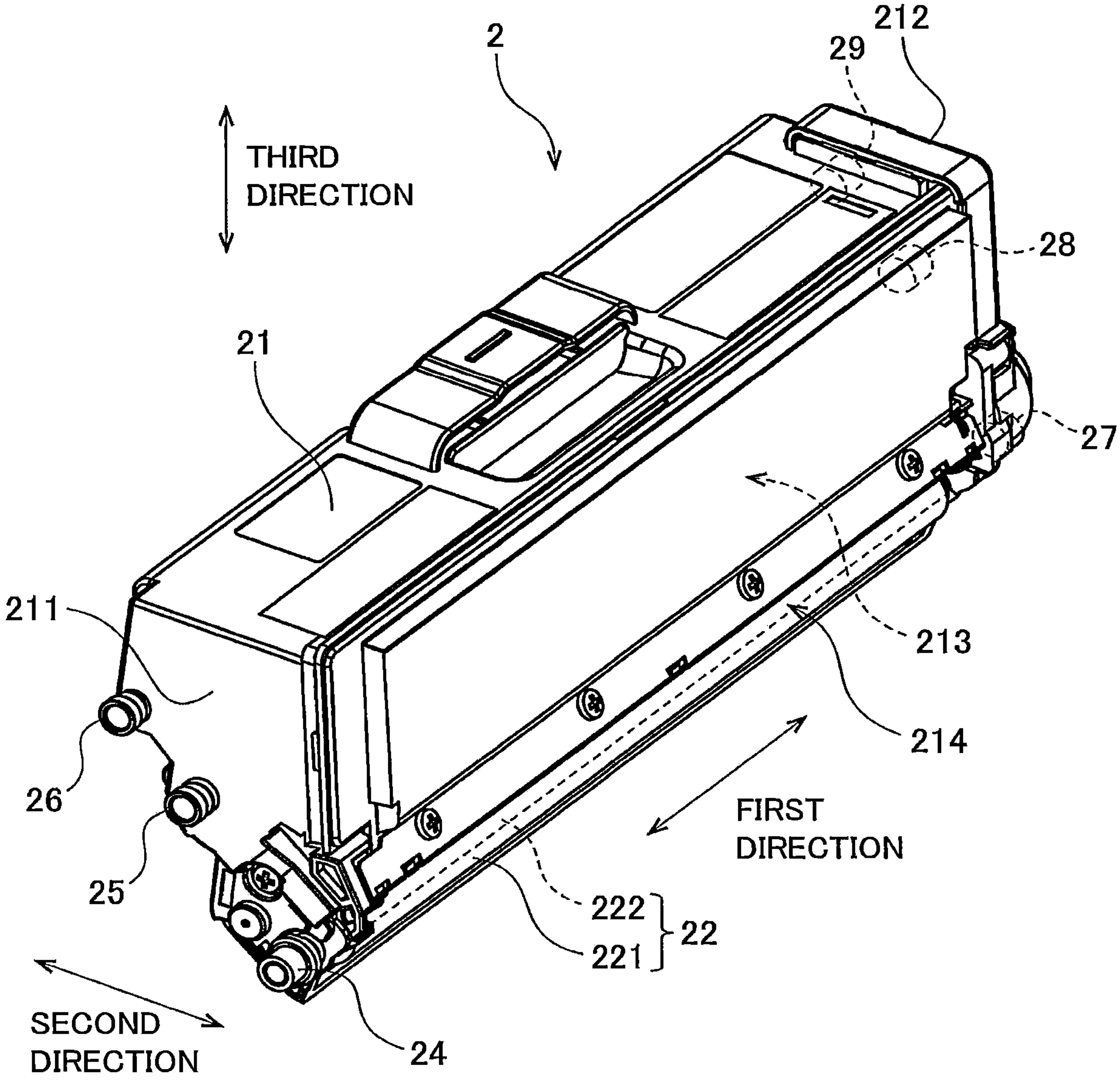
FIG. 4 is a perspective view of the developing cartridge according to the embodiment.
Figure 5:
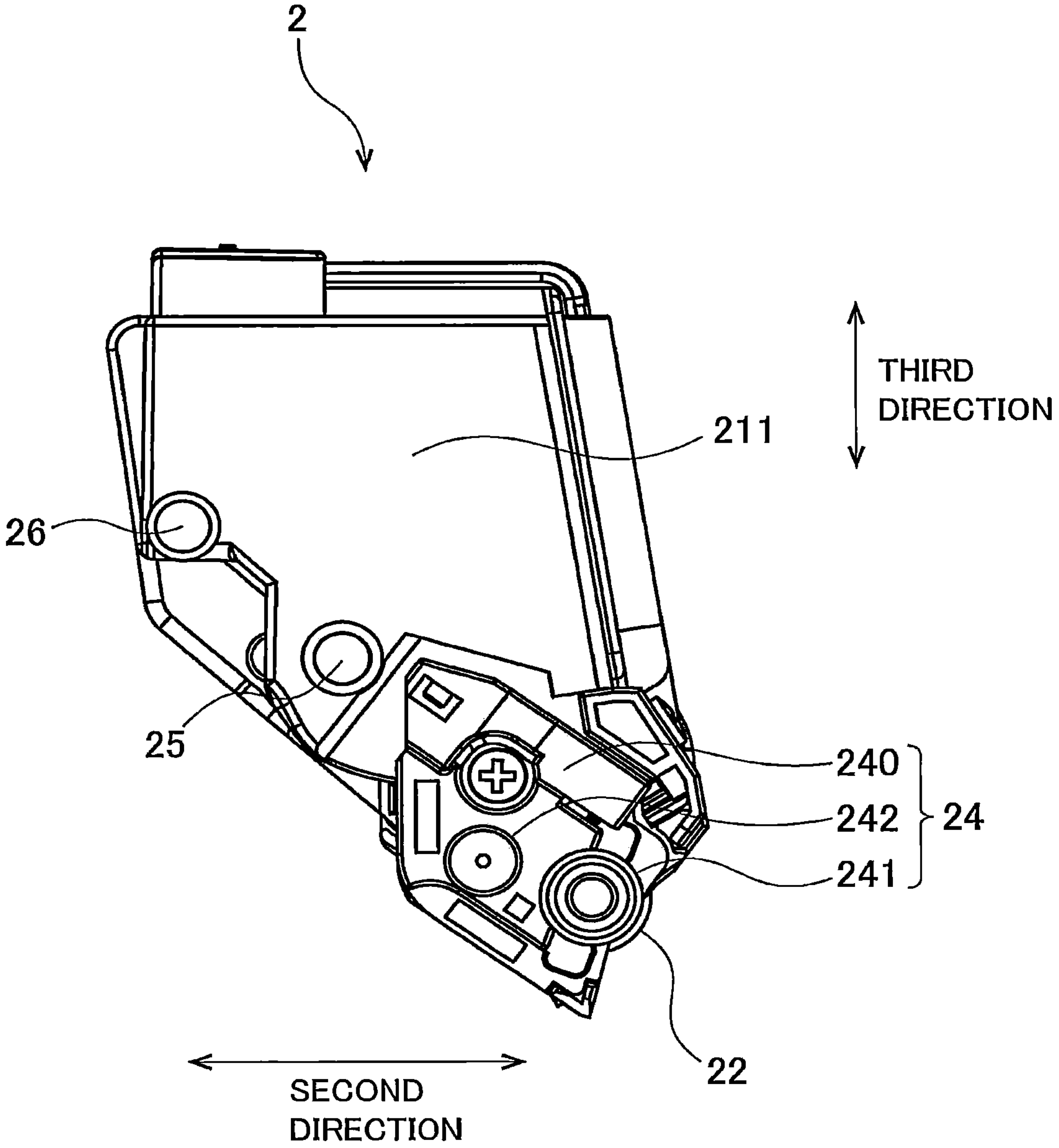
FIG. 5 is a plan view of the developing cartridge according to the embodiment as viewed in a first direction.
Figure 6:
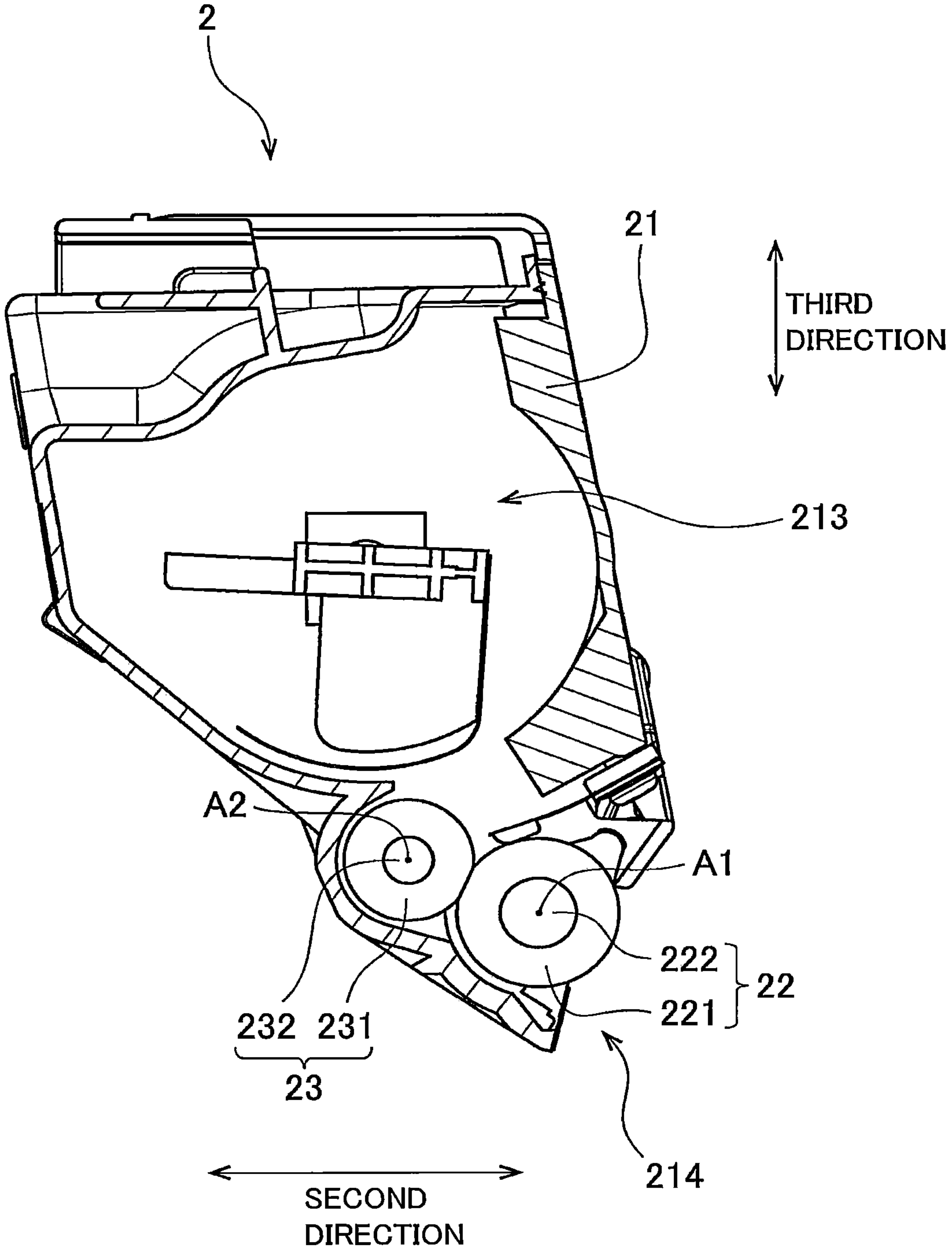
FIG. 6 is a cross-sectional view of the developing cartridge according to the embodiment taken along a plane perpendicular to the first direction.

As illustrated in FIGS. 4 through 6, the developing cartridge 2 includes a casing 21, the developing roller 22, a supply roller 23, an electrode 24 as an example of a first electrode, a first boss 25, and a second boss 26.

The casing 21 is configured to accommodate therein developing agent. The casing 21 has a first outer surface 211 and a second outer surface 212, and extends in the first direction directing from the first outer surface 211 to the second outer surface 212 and vice versa. A storage chamber 213 is provided inside the casing 21 for accommodating the developing agent. The casing 21 has one end portion in the third direction where an opening 214 is formed. The storage chamber 213 is communicated with an outside through the opening 214.

The developing roller 22 is rotatable about a first axis A1 extending in the first direction. The developing roller 22 is positioned at the opening 214. That is, the developing roller 22 is positioned at one end portion in the third direction of the casing 21. The developing roller 22 is movable together with the casing 21. The developing roller 22 includes a developing roller body 221, and a developing roller shaft 222. The developing roller body 221 is hollow cylindrical in shape extending in the first direction, and is made from rubber having elasticity. The developing roller shaft 222 extends through the developing roller body 221, and is solid cylindrical in shape extending along the first axis A1. The developing roller shaft 222 is made from metal or electrically conductive resin.

The developing roller body 221 is fixed to the developing roller shaft 222 avoiding relative rotation therebetween. The developing roller shaft 222 has one end portion in the first direction fixed to a developing roller gear (not illustrated) positioned at the second outer surface 212. Hence, rotation of the developing roller gear causes rotation of the developing roller shaft 222 and the developing roller body 221. Upon attachment of the developing cartridge 2 to the drum unit 1, an outer surface of the developing roller body 221 is in contact with an outer surface of the photosensitive drum 11.

Incidentally, the developing roller shaft 222 needs not extend through a length of the developing roller body 221 in the first direction. For example, a pair of developing roller shafts 222 are provided, and each roller shaft 222 extends from each end in the first direction of the developing roller body 221 in the first direction.

The supply roller 23 is rotatable about a second axis A2 extending in the first direction. The supply roller 23 is positioned between the developing roller 22 and the storage chamber 213. The supply roller 23 is movable together with the casing 21. The supply roller includes a supply roller body 231, and a supply roller shaft 232. The supply roller body 231 is hollow cylindrical in shape extending in the first direction, and is made from rubber having elasticity. The supply roller shaft 232 extends through the supply roller body 231, and is solid cylindrical in shape extending along the second axis A2. The supply roller shaft 232 is made from metal or electrically conductive resin.

The supply roller body 231 is fixed to the supply roller shaft 232 avoiding relative rotation therebetween. The supply roller shaft 232 has one end portion in the first direction fixed to a supply roller gear (not illustrated) positioned at the second outer surface 212. Hence, rotation of the supply roller gear causes rotation of the supply roller shaft 232 and the supply roller body 231.

Incidentally, the supply roller shaft 232 needs not extend through a length of the supply roller body 231 in the first direction. For example, a pair of supply roller shafts 232 are provided, and each roller shaft 232 extends from each end in the first direction of the supply roller body 231 in the first direction.

An outer surface of the supply roller 23 and the outer surface of the developing roller 22 are in contact with each other. By rotating the developing roller 22 and the supply roller 23, developing agent is supplied from the storage chamber 213 to the outer surface of the developing roller 22 through the supply roller 23. In this case, the developing agent is subjected to triboelectric charging between the supply roller 23 and the developing roller 22. Further, as described later, bias voltage is applied to the developing roller shaft 222 and the supply roller shaft 232. Hence, the developing agent is electro-statically attracted to and carried on the outer peripheral surfaces of the supply roller body 231 and the developing roller body 221.

Thereafter, the developing agent carried on the outer peripheral surface of the developing roller body 221 is supplied to the photosensitive drum 11 of the drum unit 1. In this case, the developing agent moves from the developing roller body 221 to the photosensitive drum 11 in accordance with an electrostatic latent image formed on the outer peripheral surface of the photosensitive drum 11. Hence, the electrostatic latent image becomes a visible toner image on the outer peripheral surface of the photosensitive drum 11. Then, the toner image is transferred from the photosensitive drum 11 to the printing sheet.

The electrode 24 is positioned at the outer surface 211 of the casing 21, and is made from electrically conductive material. The electrode functions not only as a bearing for rotatably supporting the developing roller shaft 222 and the supply roller shaft 232, but also as an electrode for supplying bias voltage to the developing roller shaft 222 and the supply roller shaft 232. Electrically conductive resin is preferable as a material of the electrode 24 because of easiness of producing the electrode having complicated shape. However, metal is also available as the material of the electrode 24.

Figure 7:
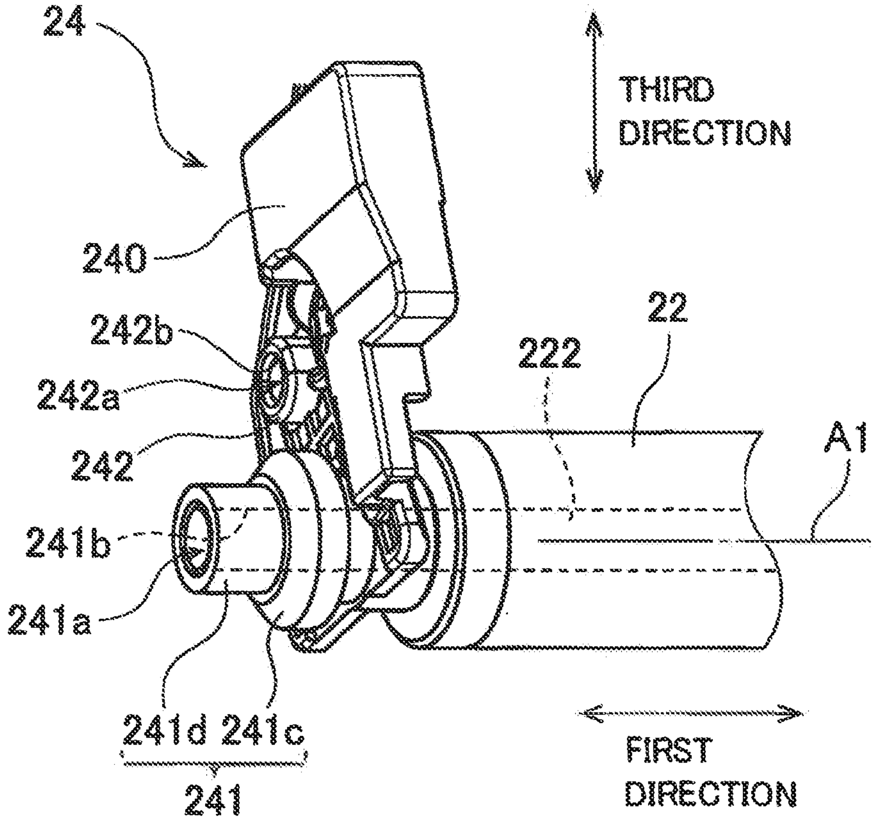
FIG. 7 is a perspective view illustrating one end portion in the first direction of a developing roller and an electrode in the developing cartridge according to the embodiment.

As illustrated in FIG. 7, the electrode 24 includes a base portion 240, a first collar 241, and a second collar 242. The base portion 240 has a generally plate-like shape extending perpendicular to the first direction. The base portion 240 is fixed to the first outer surface 211 of the casing 21 by a screw.

The first collar 241 extends from the base portion 240 in a direction away from the casing 21 in the first direction, and is hollow cylindrical. The first collar 241 rotatably supports one end portion in the first direction of the developing roller shaft 222. Specifically, the first collar 241 has a through-hole **241*a* extending in the axial direction. An inner peripheral surface of the through-hole 241*a* serves as a hollow cylindrical bearing surface 241*b*. The one end portion in the first direction of the developing roller shaft 222 is rotatably fitted with the through-hole 241*a*. Thus, the electrode 24 is electrically connected to the developing roller shaft 222. An outer surface of the one end portion of the developing roller shaft 222 is in rotational-sliding contact with the bearing surface 241*b*. As described above, since electrically conductive resin is used as the material of the electrode 24, sufficient slidability between the electrode 24 (bearing surface 241*b*) and the developing roller shaft 222** is obtained rather than a case where the electrode is made from metal.

Incidentally, instead of the through-hole **241*a*, a distal end portion of the first collar 241 may have a bottom wall to provide a recessed portion. Further, the through-hole 241*a* or the recessed portion may not necessarily cover an entire peripheral surface of the one end portion of the developing roller shaft 222. That is, the through-hole or the recessed portion covering at least a part of the peripheral surface of the one end portion of the developing roller shaft 222** is sufficient.

Further, not only direct contact but also indirect contact is available between the electrode 24 and the developing roller shaft 222. In the latter case, additional electrically conductive member may be interposed between the electrode 24 and the developing roller shaft 222. For example, the one end portion of the developing roller shaft 222 may be capped with a cap made from electrically conductive material, and the cap may be rotatably supported by the first collar 241.

As illustrated in FIG. 7, the first collar 241 includes a large diameter portion 241*c* and a small diameter portion 241*d*. The large diameter portion 241*c* protrudes from the base portion 240 in the direction away from the casing 21 in the first direction, and is hollow cylindrical. The small diameter portion 241*d* protrudes from the large diameter portion 241*c* in the direction away from the casing 21 in the first direction, and is hollow cylindrical. The outer peripheral surfaces of the large and small diameter portions 241*c* and 241*d* are coaxial with the first axis A1. An outer diameter of the large diameter portion 241*c* is greater than that of the small diameter portion 241*d*.

The second collar 242 extends from the base portion 240 in a direction away from the casing 21 in the first direction, and is hollow cylindrical. The second collar 242 rotatably supports one end portion in the first direction of the supply roller shaft 232. Specifically, the second collar 242 has a through-hole 242*a* extending in the axial direction. An inner peripheral surface of the through-hole 242*a* serves as a hollow cylindrical bearing surface 242*b*. The one end portion in the first direction of the supply roller shaft 232 is rotatably fitted with the through-hole 242*a*. Thus, the electrode 24 is electrically connected to the supply roller shaft 232. That is, in this embodiment, the electrode 24 is electrically connected to both the developing roller shaft 222 and the supply roller shaft 233 so that bias voltage can be supplied to both the developing roller shaft 222 and the supply roller shaft 232 from the electrode 16 of the drum unit 1 through the electrode 24. An outer surface of the one end portion of the supply roller shaft 232 is in rotational-sliding contact with the bearing surface 242*b*. As described above, since electrically conductive resin is used as the material of the electrode 24, sufficient slidability between the electrode 24 and the supply roller shaft 232 is obtained rather than a case where the electrode is made from metal.

Incidentally, instead of the through-hole 242*a*, a distal end portion of the second collar 242 may have a bottom wall to provide a recessed portion. Further, the through-hole 242*a* or the recessed portion may not necessarily cover an entire peripheral surface of the one end portion of the supply roller shaft 232. That is, the through-hole or the recessed portion covering at least a part of the peripheral surface of the one end portion of the supply roller shaft 232 is sufficient.

Further, not only direct contact but also indirect contact is available between the electrode 24 and the supply roller shaft 232. In the latter case, additional electrically conductive member may be interposed between the electrode 24 and the supply roller shaft 232. For example, the one end portion of the supply roller shaft 232 may be capped with a cap made from electrically conductive material, and the cap may be rotatably supported by the second collar 242.

As illustrated in FIGS. 4 and 5, the first boss 25 is positioned at the first outer surface 211 of the casing 21. The first boss 25 extends in the first direction at a position away from the developing roller 22 in the second and third directions. Specifically, the first boss 25 protrudes outward in the first direction from the first outer surface 211 of the casing 21. The first boss 25 has a strength sufficient for supporting a weight of the developing cartridge 2. The first boss 25 is a segment separate from the casing 21, and is fixed to the casing 21. However, the first boss 25 may be integral with the outer surface 211 of the casing 21. The first boss 25 is solid cylindrical in shape extending in the first direction. However, the first boss 25 may have other shape such as hollow cylindrical shape and rectangular column.

As illustrated in FIGS. 4 and 5, the second boss 26 is positioned at the first outer surface 211 of the casing 21. The second boss 26 extends in the first direction at a position further away from the developing roller 22 in the second and third directions than the first boss 25 is from the developing roller 22. Specifically, the second boss 26 protrudes outward in the first direction from the first outer surface 211 of the casing 21. The second boss 26 is a segment separate from the casing 21, and is fixed to the casing 21. However, the second boss 26 may be integral with the outer surface 211 of the casing 21. The second boss 26 is solid cylindrical in shape extending in the first direction. However, the second boss 26 may have other shape such as hollow cylindrical shape and rectangular column.

As illustrated in FIG. 4, the developing cartridge 2 further includes a positioning protrusion 27, a third boss 28, and a fourth boss 29 those positioned at the second outer surface 212. The first collar 241, the first boss 25, and the second boss 26 at the first outer surface 211 are positioned symmetrical with respect to a center of the casing 21 in the first direction with the positioning protrusion 27, the third boss 28, and the fourth boss 29 at the second outer surface 212, respectively. That is, the first collar 241 and the positioning protrusion 27 are on a linear line extending in the first direction. Further, the positioning protrusion 27 has a shape the same as that of the first collar 241, and protrudes in the first direction opposite to the protruding direction of the first collar 241. The first boss 25 and the third boss 28 are on a linear line extending in the first direction. Further, the third boss 28 has a shape the same as that of the first boss 25, and protrudes in the first direction opposite to the protruding direction of the first boss 25. The second boss 26 and the fourth boss 29 are on a linear line extending in the first direction. Further, the fourth boss 29 has a shape the same as that of the second boss 26, and protrudes in the first direction opposite to the protruding direction of the second boss 26.

4. Attaching Operation

Next, operation for attaching the developing cartridge 2 to the drum unit 1 will be described with reference to FIG. 8 in which several parts of the drum unit 1 such as the photosensitive drum 11, the support portion 13, the first pressure portion 14, the second pressure portion 15, and the electrode 16 are illustrated by two dotted chain line.

By inserting the developing cartridge 2 into the holding portion 120, the first boss 25 is brought into contact with the support surface 131 of the support portion 13 of the first side plate 121. Similarly, the third boss 28 is brought into contact with a support surface of the support portion of the second side plate 122. Hence, a weight of the developing cartridge 2 is supported by the support surface 131 of the support portion 13 of the first side plate 121 and the support surface of the support portion of the second side plate 122.

Further, in the process of inserting the developing cartridge 2 into the holding portion 120, the second boss 26 moves in the third direction while being in sliding contact with the first pressure portion 14 of the first side plate 121.

Similarly, the fourth boss 29 moves in the third direction while being in sliding contact with the first pressure portion of the second side plate 122. In this case, the first pressure portion 14 of the first side plate 121 and the first pressure portion of the second side plate 122 are temporarily moved to their release positions. Then, the first pressure portion 14 moves from the release position to the lock position by the urging force of the spring after the second boss 26 moves past the first pressure portion 14. Hence, the first pressure portion 14 urges the second boss 26 in the third direction toward the photosensitive drum 11. Similarly, the first pressure portion of the second side plate 122 urges the fourth boss 29 in the third direction toward the photosensitive drum 11.

As a result, the casing 21 of the developing cartridge 2 is pivotally moved about the first boss 25 and the third boss 28 as indicated by a broken line arrow with respect to the drum unit 1. Thus, the outer peripheral surface of the first collar 241 is brought into contact with the contact surface 161 of the electrode 16, and further, the outer peripheral surface of the positioning protrusion 27 positioned at the second outer surface 212 of the developing cartridge 2 is brought into contact with the contact surface of the second side plate 122. Accordingly, pivotal movement of the casing 21 is stopped. Consequently, pivot posture of the developing cartridge 2 about the axis extending in the first direction is fixed relative to the drum unit 1.

Concurrently with or after the pivotal movement of the casing 21, the developing cartridge 2 is pressed in the second direction by the second pressure portion 15 of the first side plate 121 and by the second pressure portion of the second side plate 122. Specifically, a part of the outer surface of the casing 21 is pressed toward the photosensitive drum 11 by the second pressure portion 15 of the first side plate 121, and another part of the outer surface of the casing 21 is pressed toward the photosensitive drum 11 by the second pressure portion of the first side plate 122. Accordingly, the developing cartridge 2 moves in the second direction while its pivotal posture about the axis extending in the first direction is maintained. As a result, the outer peripheral surface of the developing roller 22 is brought into contact with the outer peripheral surface of the photosensitive drum 11. In the present embodiment, the outer peripheral surface of the photosensitive drum 11 and the outer peripheral surface of the developing roller 22 is brought into contact with each other as a result of the casing 21 being pressed in the second direction by the second pressing portion 15. However, the outer peripheral surface of the photosensitive drum 11 and the outer peripheral surface of the developing roller 22 may be brought into contact with each other only by pivoting movement of the casing 21 without the pressure by the first pressure portion 14 and the second pressure portion 15.

In this state, the weight of the developing cartridge 2 is supported by the support surface 131 of the support portion 13 of the first side plate 121 and the support surface of the support portion of the second side plate 22, as described above. Therefore, contacting pressure between the outer peripheral surface of the photosensitive drum 11 and the outer peripheral surface of the developing roller 22 is less susceptible to the weight of the developing cartridge 2. Consequently, change in contacting pressure between the outer peripheral surface of the photosensitive drum 11 and the outer peripheral surface of the developing roller 22 dependent on residual amount of the developing agent accommodated in the developing cartridge 2 can be restrained.

Further, in a state of completion of attachment of the developing cartridge 2 to the drum unit 1, the outer surface of the first collar 124 of the electrode 24 is in contact with the contact surface 161 of the electrode 16. Hence, the electrode 24 and the electrode 16 are electrically connected to each other. Particularly, in the state of completion of attachment of the developing cartridge 2 to the drum unit 1, the outer surface of the small diameter portion 241*d* of the first collar 241 and an end surface in the first direction of the large diameter portion 241*c* are in contact with the electrode 16. Therefore, the reliability of the electrical connection between the electrode 16 and the electrode 24 can be enhanced.

Thereafter, the drum unit 1 to which the developing cartridge 2 is attached is attached to the main casing 101 of the image forming apparatus 100, whereupon the main electrode positioned at the main casing 101 is electrically connected to the electrode 16 positioned in the drum unit 1. Thus, bias voltage can be supplied from the controller 102 to the developing roller shaft 222 and the supply roller shaft 232 through the main electrode, the electrode 16, and the electrode 24.

As described above, according to the above-described embodiment, the electrode 24 of the developing cartridge 2 is brought into contact with the electrode 16 of the drum unit 1 by making use of pivotal movement of the developing cartridge 2 about the axis of the first boss 25. Hence, the electrical contact between the first and electrodes 24 and 16 can be attained without employment of a spring between the electrode 24 and the casing of the developing cartridge 2.

5. Modifications

According to the above-described embodiment, the electrode 24 including the base portion 240, the first collar 241, and the second collar 242 is a single or integral component. However, the electrode 24 may be provided by a plurality of components. For example, the base portion 240 and the first collar 241 are different components from each other. Further, the first collar 241 may be rotatable about the first axis A1 with respect to the casing 21 in the state of insertion of the one end portion of the developing roller shaft 222 in the first collar 241. With this structure, frictional resistance between the electrode 16 and the first collar 241 can be lowered during pivotal motion of the developing cartridge 2 with respect to the drum unit 1.

Further, in the above-described embodiment, the electrode 24 is positioned at the first outer surface 211 of the casing 21. However, the electrode 24 may be positioned at the second outer surface 212 of the casing 21.

Further, in the above-described embodiment, the electrode 24 is in electrical contact with both the developing roller shaft 222 and the supply roller shaft 232. However, the electrode 24 may be in electrical contact with the developing roller shaft 222 only.

Further, details on shape of the developing cartridge may not be limited to the above-described shape, and various parts and components those appearing in the above-described embodiment and modifications may be combined together as long as technical conflict is avoidable.

While the description has been made in detail with reference to the embodiments thereof, it would be apparent to those skilled in the art that many modifications and variations may be made therein without departing from the spirit of the disclosure.

What is claimed is:

1. A developing cartridge comprising:

a casing in which developing agent is accommodated, the casing having a first outer surface in a first direction;

a developing roller comprising a developing roller shaft extending along a first axis extending in the first direction, the developing roller being rotatable about the first axis, the developing roller being positioned at one end portion of the casing in a second direction crossing the first direction;

a supply roller comprising a supply roller shaft extending along a second axis extending in the first direction, the supply roller being rotatable about the second axis;

an electrode attached to the first outer surface by a screw, the electrode being electrically connected to both of the developing roller shaft and the supply roller shaft, the electrode being made from electrically conductive resin;

a first boss positioned at the first outer surface of the casing, the first boss extending in the first direction, the first boss being spaced apart from the electrode, the first boss being a component separate from the casing; and a second boss positioned at the first outer surface, the second boss extending in the first direction, the second boss being farther from the developing roller in both of the second direction and a third direction than the first boss is from the developing roller, the third direction crossing both of the first direction and the second direction.

2. The developing cartridge according to claim 1, wherein the second boss is a component separate from the casing.

3. The developing cartridge according to claim 2, wherein the second boss is fixed to the casing.

4. The developing cartridge according to claim 1, wherein the first boss and the second boss extend from the first outer surface of the casing.

5. The developing cartridge according to claim 1, further comprising:

a third boss positioned at a second outer surface of the casing in the first direction, the third boss extending in the first direction; and a fourth boss positioned at the second outer surface of the casing, the fourth boss extending in the first direction.

6. The developing cartridge according to claim 5, wherein the first boss and the third boss are on a linear line extending in the first direction, and wherein the second boss and the fourth boss are on a linear line extending in the first direction.

7. The developing cartridge according to claim 1, wherein the electrode covers at least a part of an outer peripheral surface of one end portion of the developing roller shaft in the first direction.

8. The developing cartridge according to claim 7, wherein the electrode has one of a first recess and a first through-hole allowing the one end portion of the developing roller shaft to be inserted therein.

9. The developing cartridge according to claim 8, wherein the developing roller is rotatable in a state where the one end portion of the developing roller shaft is inserted in the one of the first recess and the first through-hole.

10. The developing cartridge according to claim 9, wherein the electrode comprises a first collar having the one of the first recess and the first through-hole, the first collar including a small diameter portion and a large diameter portion having an outer diameter larger than an outer diameter of the small diameter portion.

11. The developing cartridge according to claim 10, wherein the small diameter portion is farther from the first outer surface in the first direction than the large diameter portion is from the first outer surface.

12. The developing cartridge according to claim 10, wherein the first collar is rotatable about the first axis relative to the casing in a state of insertion of the one end portion of the developing roller shaft in the one of the first recess and the first through-hole.

13. The developing cartridge according to claim 10, further comprising a protrusion positioned at a second outer surface of the casing in the first direction, the protrusion extending in the first direction, wherein the first collar and the protrusion are on a linear line extending in the first direction.

14. The developing cartridge according to claim 10, wherein the electrode comprises a second collar having one of a second recess and a second through-hole allowing one end portion of the supply roller shaft in the first direction to be inserted therein.

15. The developing cartridge according to claim 14, wherein the first collar extends in the first direction, the first collar having a base end and a distal end opposite to the base end in the first direction, the distal end of the first collar being farther from the first outer surface in the first direction than the base end of the first collar is from the first outer surface, wherein the second collar extends in the first direction, the second collar having a base end and a distal end opposite to the base end in the first direction, the distal end of the second collar being farther from the first outer surface in the first direction than the base end of the second collar is from the first outer surface, and wherein the distal end of the first collar is farther from the first outer surface in the first direction than the distal end of the second collar is from the first outer surface.

16. The developing cartridge according to claim 1, wherein the first boss is configured to support a weight of the developing cartridge.

17. The developing cartridge according to claim 1, wherein the second boss is positioned at one end of the first outer surface in the third direction.

18. The developing cartridge according to claim 1, wherein the first direction is perpendicular to both of the second direction and the third direction, and wherein the second direction is perpendicular to the third direction.

19. The developing cartridge according to claim 1, wherein the first boss is fixed to the casing.

20. The developing cartridge according to claim 1, wherein the first boss and the second boss are solid cylindrical in shape.

* * * * *